US011969077B2

(12) United States Patent
Ursachi

(10) Patent No.: US 11,969,077 B2
(45) Date of Patent: Apr. 30, 2024

(54) MODULAR SPACKLE KNIFE CADDY

(71) Applicant: Valentin Ursachi, Port Washington, NY (US)

(72) Inventor: Valentin Ursachi, Port Washington, NY (US)

( * ) Notice: Subject to any disclaimer, the term of this patent is extended or adjusted under 35 U.S.C. 154(b) by 305 days.

(21) Appl. No.: 17/585,408

(22) Filed: Jan. 26, 2022

(65) Prior Publication Data

US 2022/0232958 A1 Jul. 28, 2022

Related U.S. Application Data

(60) Provisional application No. 63/142,389, filed on Jan. 27, 2021.

(51) Int. Cl.

| | |
|---|---|
| ***A45F 5/02*** | (2006.01) |
| ***B25H 3/00*** | (2006.01) |
| ***B25H 3/06*** | (2006.01) |

(52) U.S. Cl.

CPC ............ *A45F 5/021* (2013.01); *B25H 3/006* (2013.01); *B25H 3/06* (2013.01); *A45F 2200/0575* (2013.01)

(58) Field of Classification Search

CPC ............. A45F 5/021; A45F 2200/0575; A45F 2005/025; A45F 5/14; B26B 29/025; B26B 29/02; Y10S 224/904; B25H 3/006

USPC ................................ 224/677, 232, 282, 904

See application file for complete search history.

(56) References Cited

U.S. PATENT DOCUMENTS

| | | | | |
|---|---|---|---|---|
| 2,783,536 | A * | 3/1957 | McQueary | B26B 29/025 224/675 |
| 4,408,706 | A * | 10/1983 | Hurley | B65C 9/00 224/904 |
| 4,746,042 | A | 5/1988 | King | |
| 5,257,695 | A | 11/1993 | Henke | |
| 6,604,659 | B1 * | 8/2003 | Graves | B25H 3/00 224/232 |
| 8,276,768 | B1 | 10/2012 | Johnson | |
| 10,040,605 | B1 | 8/2018 | Popier | |
| 11,623,358 | B2 * | 4/2023 | Hunt | B26B 29/025 30/151 |
| 2004/0040917 | A1 | 3/2004 | Lopinto | |
| 2018/0222249 | A1 | 8/2018 | Treacy | |
| 2020/0029677 | A1 * | 1/2020 | Griffin | A45F 5/021 |

* cited by examiner

*Primary Examiner* — Adam J Waggenspack

(57) ABSTRACT

A modular spackle knife caddy is an apparatus that houses spackle knives for a user while executing tasks. The apparatus a U-shaped hook, a bracing plate, a primary spackle-knife holder, and a primary attachment mechanism. The U-shaped hook attaches onto a garment. The bracing plate connects the at least one spackle knife holder with the hook. The primary spackle-knife holder retains at least one spackle knife. The primary attachment mechanism connects the at least one primary spackle knife holder with the mounting plate. In a first embodiment, the at least one primary spackle knife holder includes a receptacle. In a second embodiment, the at least one primary spackle knife holder includes a sheath. A third embodiment further includes a secondary spackle knife holder, wherein the at least one primary spackle knife holder includes a receptacle. The at least one secondary spackle knife holder includes a sheath.

19 Claims, 9 Drawing Sheets

MODULAR SPACKLE KNIFE CADDY

The current application claims a priority to the U.S. Provisional Patent application Ser. No. 63/142,389 filed on Jan. 27, 2021.

FIELD OF THE INVENTION

The present invention generally relates to tool caddies. More specifically, the present invention is a modular spackle knife caddy.

BACKGROUND OF THE INVENTION

Interior construction projects often require tradesmen to apply spackle to walls. These artisans may require several spackle knives to get the job done. However, carrying several spackle knifes is unwieldy and current options are unsafe. The options artisans have today are simply inserting the handle of the spackle knife into a pocket of their working clothes or hammer holders that hook onto the user's belt. These solutions are dangerous as they leave the thin metal blade of the spackle knife exposed which can lead to injuries. They also limit movement is it may be uncomfortable to crouch while working on lower portions of a wall.

It is therefore an objective of the present design to provide the user with a comfortable and easy modular means of personal spackle knife carry. The present invention attaches to the belt of the user. The present invention may be worn by a user in any position. The present invention protects the user from the sharp blades of the spackle knives. The present invention may retain several smaller spackle knives at once, as well as larger spackle knives, which may also be easily removable.

DETAILED DESCRIPTIONS OF THE INVENTION

Figure 1:
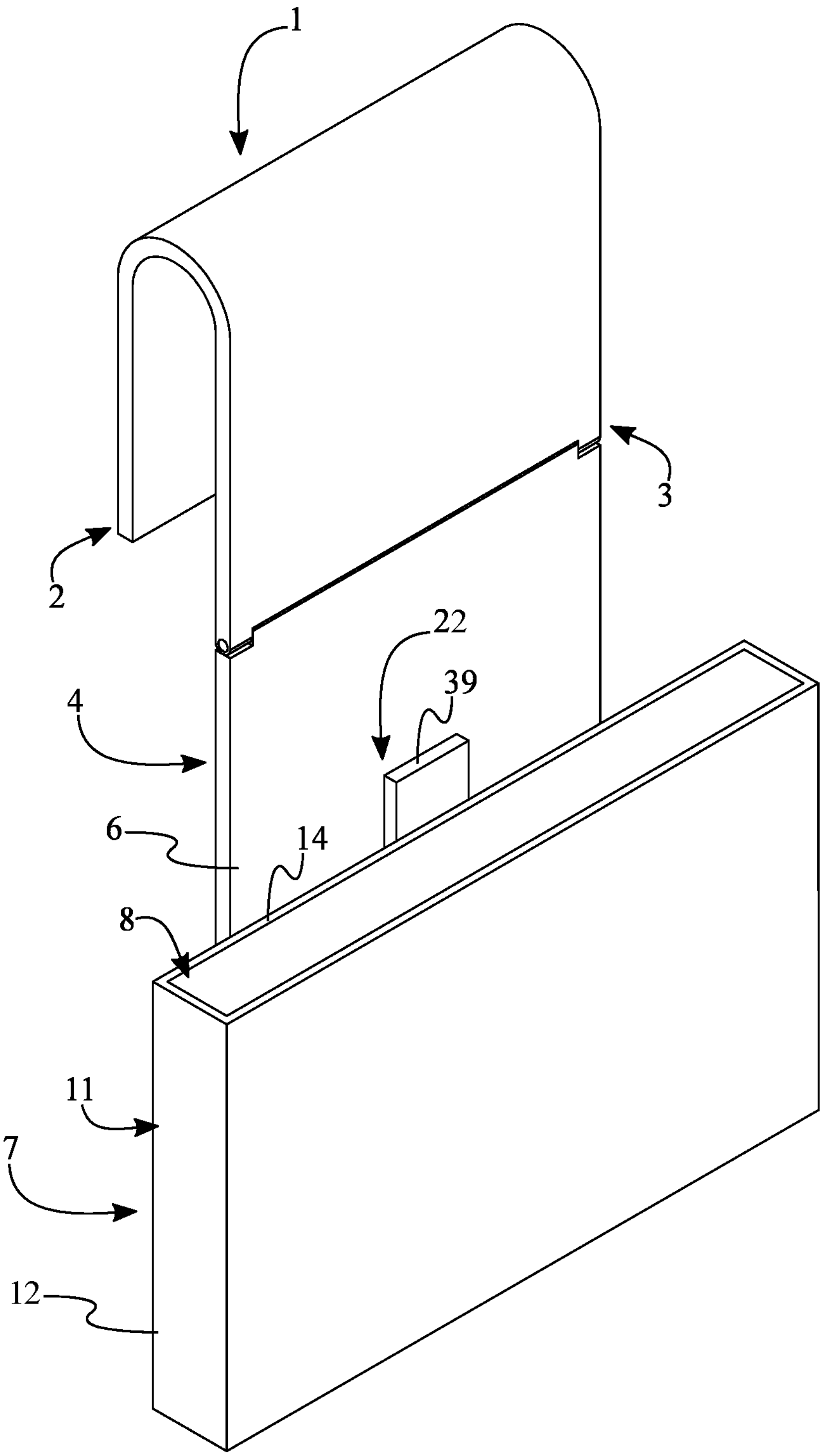
FIG. 1 is a perspective view of a first embodiment of the present invention.

All illustrations of the drawings are for the purpose of describing selected versions of the present invention and are not intended to limit the scope of the present invention.

The present invention is a modular spackle knife caddy. The present invention houses at least one spackle knife that is readily accessible by a user while executing tasks and projects. The present invention safely contains at least one spackle knife throughout the movements of the user. The present invention preferably houses at least one spackle knife with a width of approximately 0.5 inches to 12 inches in width. The present invention may configure the retainers for the at least one spackle knife depending which spackle knives are needed throughout the task or project. In order to have the present invention safely connect at least one spackle knife onto a piece of clothing or garment, the present invention may comprise a U-shaped hook 1, a bracing plate 4, a primary spackle-knife holder 7, and a primary attachment mechanism 22, seen in FIG. 1, FIG. 3, FIG. 4, FIG. 5, FIG. 6, FIG. 7, and FIG. 9. The U-shaped hook 1 connects the present invention onto the clothing of the user. The U-shaped hook 1 preferably attaches to the pants or belt of a user so that the at least one spackle knife is always within reach of the user. More specifically, the U-shaped hook 1 comprises a free hook end 2 and a fixed hook end 3. The free hook end 2 latches with the piece of clothing, and the fixed hook end 3 connects the bracing plate 4 with the U-shaped hook 1. The primary spackle-knife holder 7, and consequently the at least one spackle knife, does not inhibit the movements of the user as the bracing plate 4 connects the primary spackle-knife holder 7 with the hook and provides various angles between the primary spackle-knife holder 7 and the hook. More specifically, the bracing plate 4 comprises a proximal plate face 5 and the distal plate face 6. The proximal plate face 5 is oriented towards the body of the user, and the distal plate face 6 is oriented towards the primary spackle-knife holder 7. The primary spackle-knife holder 7 houses and upholds the at least one spackle knife. The primary spackle-knife holder 7 comprises a primary knife-receiving feature 8 which readily receives and releases the at least one spackle knife within the primary spackle-knife holder 7. The U-shaped hook 1, the bracing plate 4, and the primary spackle-knife holder 7 are preferably made of hard plastic or similar robust materials to prevent any damage to the at least one spackle knife house within the present invention as well as to the body of the user. The primary attachment mechanism 22 attaches and detaches the primary spackle-knife holder 7 with the bracing plate 4.

The overall configuration of the aforementioned components safely retains spackle knives while remaining both readily accessible for and attached onto a user. In order to angle the bracing plate 4 with the U-shaped hook 1, the fixed hook end 3 is peripherally positioned with the bracing plate 4 and is hingedly connected with the bracing plate 4, as seen in FIG. 1, FIG. 3, FIG. 4, FIG. 5, FIG. 6, FIG. 7, and FIG. 9. A piece of clothing is attached between the U-shaped hook 1 and the bracing plate 4 as the free hook end 2 is oriented away from the distal plate face 6 and is positioned offset from the proximal plate face 5. The primary knife-receiving feature 8 is oriented towards the U-shaped hook 1, thereby orienting the at least one spackle knife away from the ground. If at any point the primary spackle-knife holder 7 needs to be temporarily removed or interchanged, the primary spackle-knife holder 7 is operatively mounted onto the distal plate face 6 by the primary attachment mechanism 22, wherein the primary attachment mechanism 22 is used to attach the primary spackle-knife holder 7 to the distal plate face 6 and to detach the primary spackle-knife holder 7 from the distal plate face 6.

Figure 2:
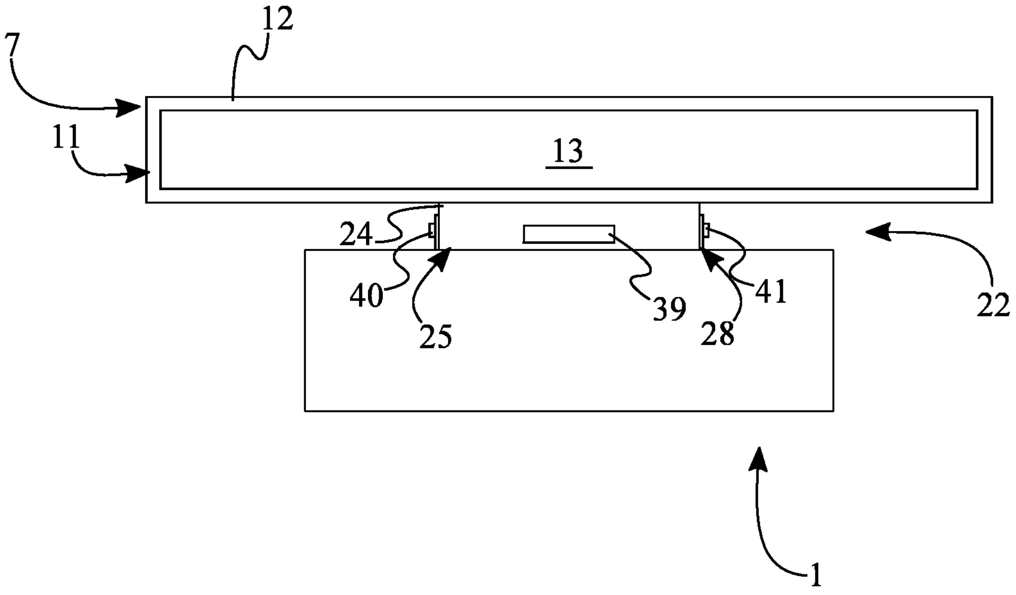
FIG. 2 is a top side view of the first embodiment of the present invention.

In a first embodiment of the present invention, the primary spackle-knife holder 7 further comprises a holding receptacle 11, seen in FIG. 1. In this preferred first embodiment, the holding receptacle 11 preferably retains a plurality of smaller spackle knives preferably with blades that are 6 inches and smaller and are freely positioned within the holding receptacle 11. In order to surround the blade portion of each of the plurality of smaller spackle knives, the holding receptacle 11 comprises a receptacle lateral wall 12 and a receptacle base wall 13. The receptacle lateral wall 12 surrounds the sides of the blade portion, and the receptacle base wall 13 upholds the plurality of smaller spackle knives. The blade portion is completely surrounded as the receptacle lateral wall 12 is positioned adjacent with the receptacle base wall 13 and is perimetrically fixed around the receptacle base wall 13, as seen in FIG. 2. The holding receptacle 11 is readily attached and detached with the bracing plate 4 as the primary attachment mechanism 22 is externally mounted onto the receptacle lateral wall 12. Furthermore, in order for the user to readily access the handles of the plurality of smaller spackle knives, the primary knife-receiving feature 8 is an opening 14 of the holding receptacle 11. The opening 14 of the holding receptacle 11 is positioned opposite the receptacle base wall 13 about the holding receptacle 11, thereby effectively housing the plurality of smaller spackle knives throughout wear and use of the present invention.

Figure 9:
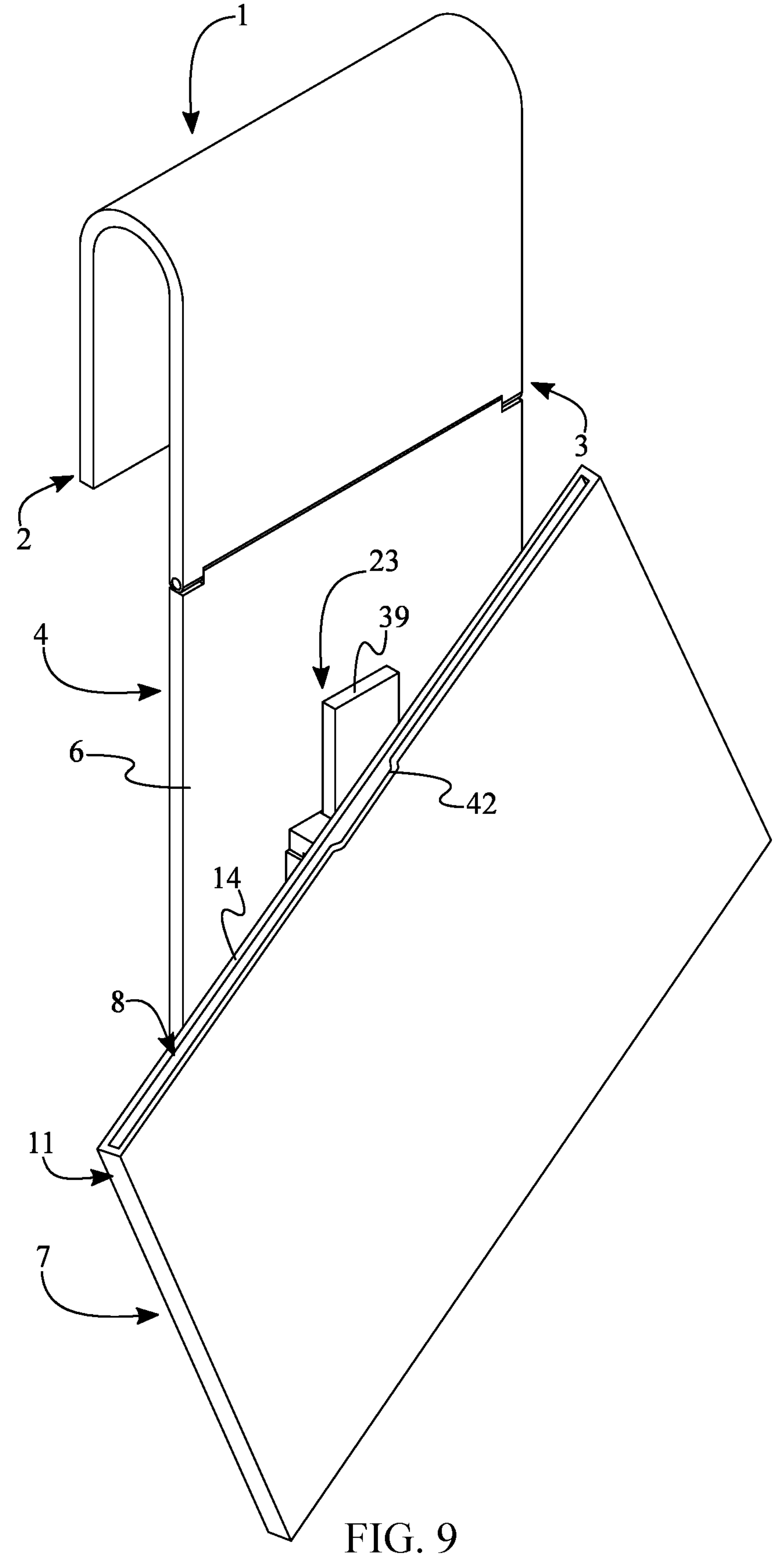
FIG. 9 is a perspective view of the first embodiment of the present invention with a handle-receiving groove.

Alternatively, in the first embodiment of the present invention, the holding receptacle 11 further comprises a handle-receiving groove 42, seen in FIG. 9. The handle-receiving groove 42 provides access for a handle of a large spackle knife within the holding receptacle 11. In this alternate first embodiment, a width of the holding receptacle 11 is smaller than a width of the holding receptacle 11 of the preferred first embodiment that has been previously discussed. More specifically, the width of the holding receptacle 11 for the alternate first embodiment is preferably 0.125 inches. In this alternate first embodiment a length of the holding receptacle 11 is larger to safely houses and grips onto a large spackle knife as the handle of the large spackle is also positioned within the holding receptacle 11. In order for the handle to traverse into the holding receptacle 11, the handle-receiving groove 42 is integrated within the receptacle lateral wall 12 and is positioned offset from the receptacle base wall 13. Moreover, the handle-receiving groove 42 is positioned coincident to an opening 14 of the holding receptacle. This arrangement contours the receptacle lateral wall 12 around the structure of the large spackle knife. In order for the large knife to be easily removed from the holding receptacle 11 with the handle-receiving groove 42, the receptacle lateral wall 12 is oriented at an acute angle with the primary attachment mechanism 22.

Figure 3:
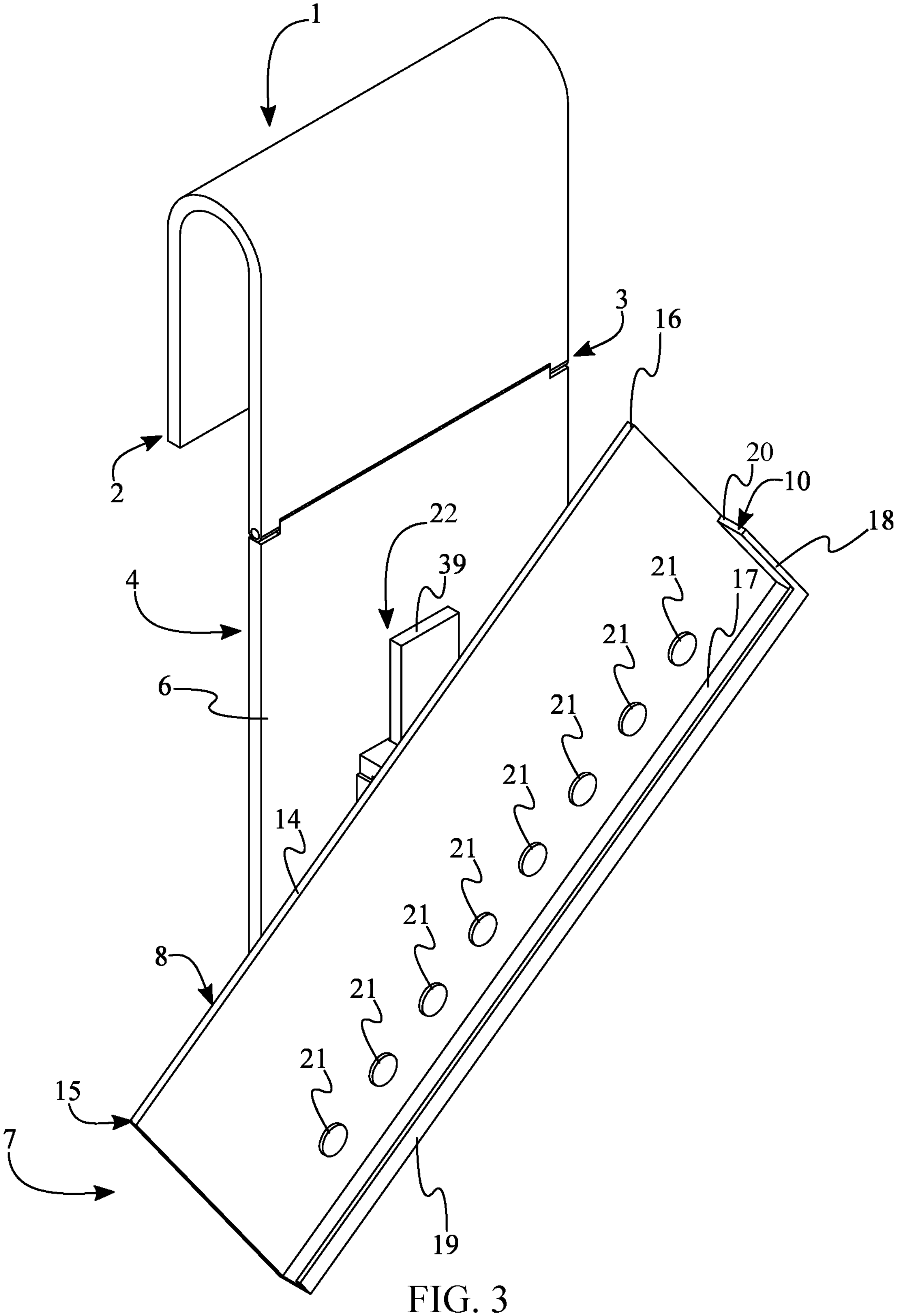
FIG. 3 is a perspective view of a second embodiment of the present invention.

In a second embodiment of the present invention, the primary spackle-knife holder 7 further comprises a holding sheath 15, seen in FIG. 3. The holding sheath 15 preferably retains a larger spackle knife, preferably with a blade between 7 inches to 12 inches, that is easily separable from the holding sheath 15. In order to retain the larger spackle knife, the holding sheath 15 comprises a cover plate 16, a ledge 17, a tab 18, and a lip 19. The cover plate 16 traverses across the width of the blade portion of the larger spackle knife. The ledge 17 upholds the spackle knife. The tab 18 serves as a stopper for a side edge of the blade portion. And the lip 19 guards the sharp edge of the larger spackle knife and prevents the larger spackle knife from being accidently separated from the holding sheath 15. In order to uphold the larger spackle knife, the ledge 17 is peripherally positioned with the cover plate 16 and is being fixed across the cover plate 16. The user easily centers the blade portion with the cover plate 16 as the tab 18 is peripherally positioned with the ledge 17 and the cover plate 16, and the tab 18 is fixed adjacent with the ledge 17 and the cover plate 16. This arrangement reduces the chances of the larger spackle knife from being accidentally pushed from side to side. The sharp edge of the blade portion is shielded between the cover plate 16 and the lip 19 as the lip 19 is positioned adjacent with the ledge 17, opposite the cover plate 16, and is fixed along the ledge 17. The bracing plate 4 nor the cover plate 16 inhibit the removal or positioning of the larger spackle knife with the holding sheath 15 as the primary attachment mechanism 22 is mounted onto the cover plate 16, opposite the ledge 17. In order to further accommodate the position of the present invention along the waistline of the user, the cover plate 16 is oriented at an acute angle with the primary attachment mechanism 22, thereby orienting the larger spackle knife towards the reach of the user. Furthermore, in order for the larger spackle knife to be readily detached from the holding sheath 15, the primary knife-receiving feature 8 is an opening 20 of the holding sheath 15. The opening 20 of the holding sheath 15 is delineated by the cover plate 16, the tab 18, and the lip 19, thereby providing clear view of the larger spackle knife while attached with the holding sheath 15 while simultaneously safely retaining the larger spackle knife.

As the opening 20 of the holding sheath 15 extends across the blade portion of a larger spackle knife, in the second embodiment of the present invention, the holding sheath 15 preferably further comprises a plurality of magnets 21, also seen in FIG. 3. The plurality of magnets 21 securely connects the blade portion with the cover plate 16 until purposefully separated by the user. As the blade portion is positioned beside the cover plate 16, opposite the primary attachment mechanism 22, the plurality of magnets 21 is positioned adjacent with the cover plate 16, opposite the primary attachment mechanism 22 as well. This arrangement allows the plurality of magnets 21 to come in direct contact with the blade portion. In order for the blade portion to be readily removed from the holding sheath 15 but firmly attached while positioned within the sheath, the plurality of magnets 21 is positioned offset from the ledge 17 and is positioned along the ledge 17. The connection between the plurality of magnets 21 and the blade portion is secure as the plurality of magnets 21 is fixed across the cover plate 16.

In order for the primary spackle-knife holder 7 to be readily attached and detached with the bracing plate 4, the primary attachment mechanism 22 comprises an insert spacer 24, an elongated hollow insert 25, and an insert sleeve 28, seen in FIG. 1 FIG. 3, FIG. 5, FIG. 6, FIG. 7, and FIG. 8. The insert spacer 24 attaches the elongated hollow insert 25 with the primary spackle-knife holder 7. The elongated hollow insert 25 latches into the insert sleeve 28, which is connected with the bracing plate 4. Moreover, the insert sleeve 28 readily receives the elongated hollow insert 25. The elongated hollow insert 25 comprises a fixed insert end 26 and a free insert end 27. The fixed insert end 26 is attached with the primary spackle-knife holder 7, and the free insert end 27 engages with the insert sleeve 28. The insert sleeve 28 comprises an open sleeve end 29 and a closed sleeve end 30. The open sleeve end 29 readily receives the free insert end 27, and the closed sleeve end 30 stops the free insert end 27 from extending any further past the insert sleeve 28 and upholds the elongated hollow insert 25 with the bracing plate 4. As the primary spackle-knife holder 7 is positioned adjacent with the distal plate face 6, the insert sleeve 28 is connected onto the distal plate face 6. In order to orient the elongated hollow insert 25, and consequently the primary spackle-knife holder 7, away from the ground, the open sleeve end 29 is oriented towards the U-shaped hook 1. The elongated hollow insert 25 is positioned offset with the primary spackle-knife holder 7 and insert sleeve 28 may be positioned around the elongated hollow insert 25 as the fixed insert end 26 is mounted onto the primary spackle-knife holder 7 by the insert spacer 24. The free insert end 27 is oriented away from the primary knife-receiving feature 8, thereby allowing the elongated hollow insert 25 to slip 19 into the insert sleeve 28 and keeping the primary knife-receiving feature 8 oriented away from the ground. The primary spackle-knife holder 7 connects with the bracing plate 4 as the elongated hollow insert 25 is positioned through the open sleeve end 29 and into the insert sleeve 28.

Figure 8:
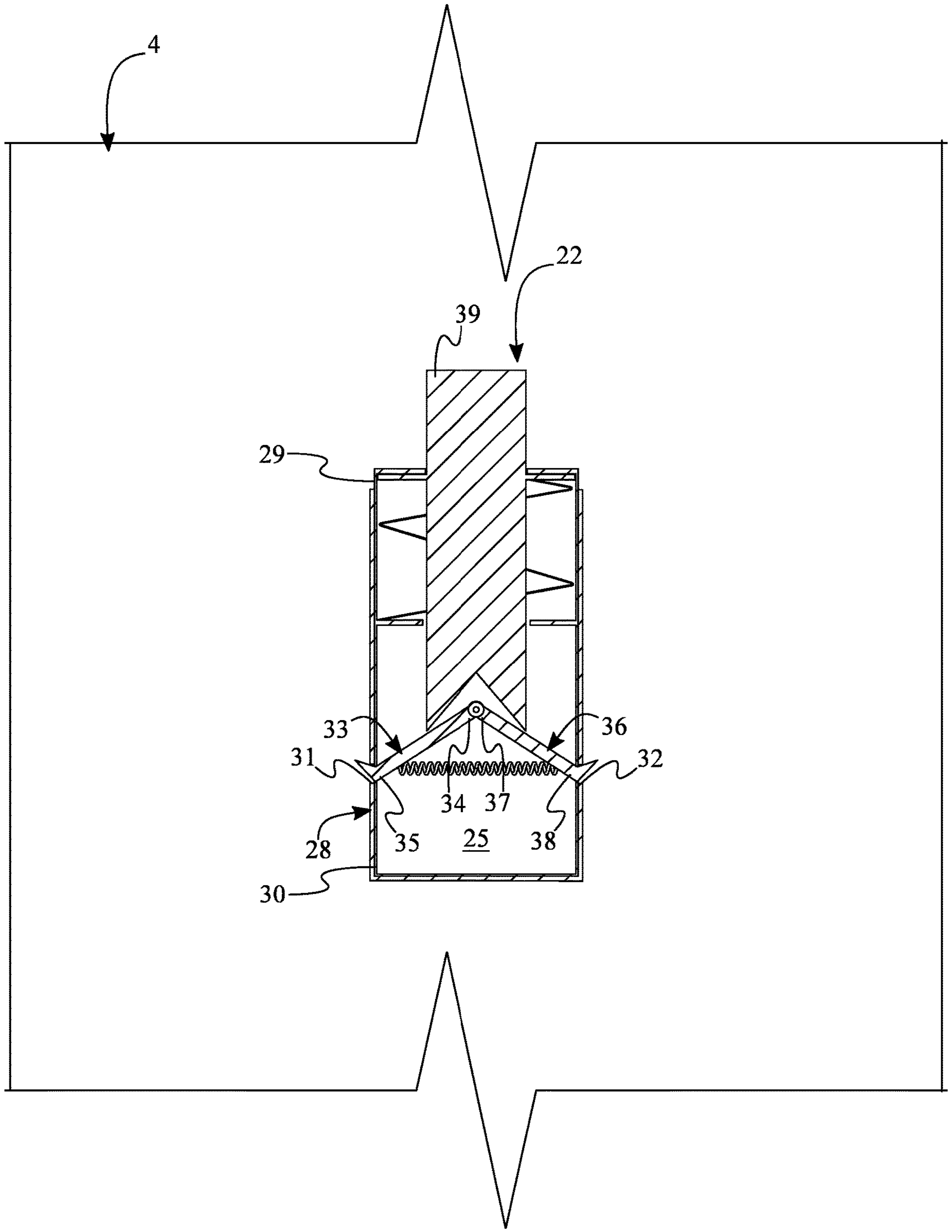
FIG. 8 is a cross-section view taken along line 8-8 in FIG. 7.

In order to release the connection between the elongated hollow insert 25 and the insert sleeve 28, the primary attachment mechanism 22 further comprises a first spring-loaded pin 33, a second spring-loaded pin 36, and a spring-loaded button 39, seen in FIG. 8. Moreover, the insert sleeve 28 further comprises a first pinhole 31 and a second pinhole 32. The first spring-loaded pin 33 and the second spring-loaded pin 36, together, attach the elongated hollow insert 25 within the insert sleeve 28 through the first pinhole 31 and the second pinhole 32, respectively. The spring-loaded button 39 releases the first spring-loaded pin 33 and the second spring-loaded pin 36 from within the first pinhole 31 and the second pinhole 32, respectively. The first pinhole 31 and the second pinhole 32 allow the first spring-loaded pin 33 and the second spring-loaded pin 36 to traverses through the insert sleeve 28 while preserving the structural integrity of the insert sleeve 28. Moreover, the first pinhole 31 and the second pinhole 32 allow the first spring-loaded pin 33 and the second spring-loaded pin 36 to extend through the insert sleeve 28 so that the primary spackle-knife holder 7 is not simply separated from the bracing plate 4 by lifting the elongated hollow insert 25 out of the insert sleeve 28. The spring-loaded button 39 must be engaged in order to retract the first spring-loaded pin 33 and the second spring-loaded pin 36. Conversely, the primary spackle-knife holder 7 is automatically attached with the bracing plate 4 once the first spring-loaded pin 33 and the second spring-loaded pin 36 extend into the first pinhole 31 and the second pinhole 32, respectively, due to a spring that simultaneously engages both the first spring-loaded pin 33 and the second spring-loaded pin 36. The spring-loaded button 39 preferably comprises a body portion and a couple of tabs. The body portion accessible by the user to push the spring-loaded button 39. The couple of tabs are internally positioned within the elongated hollow insert 25 and presses against the first spring-loaded pin 33 and the second spring-loaded pin 36 in order to retract the first spring-loaded pin 33 and the second spring-loaded pin 36. More specifically, as the spring-loaded button 39 retracts within the elongated hollow insert 25, the first spring-loaded pin 33 and the second spring loaded pin simultaneously retracts into the elongated hollow insert 25.

The overall configuration of the aforementioned components allows a user to easily attach and detach the elongated hollow insert 25 from within the insert sleeve 28. The first spring-loaded pin 33 and the second spring-loaded pin 36 remain protected within the elongated hollow insert 25 as the first spring-loaded pin 33 and the second spring-loaded pin 36 are laterally mounted within the elongated hollow insert 25, also seen in FIG. 6, FIG. 7, and FIG. 8. Moreover, the first spring-loaded pin 33 and the second spring-loaded pin 36 are positioned opposite to each other about the elongated hollow insert 25. Likewise, the first pinhole 31 and the second pinhole 32 are laterally positioned opposite to each other about the insert sleeve 28, so that the first pinhole 31 and the second pinhole 32 readily receive the first spring-loaded pin 33 and the second spring-loaded pin 36, respectively. The elongated hollow insert 25 is secured within the insert sleeve 28 as the first spring-loaded pin 33 is engaged into the first pinhole 31, and the second spring-loaded pin 36 is engaged into the second pinhole 32. This arrangement effectively secures the primary spackle-knife holder 7 with the bracing plate 4. In order for the spring-loaded button 39 to engage the first spring-loaded pin 33 and the second spring-loaded pin 36, as well as remain readily accessible by the user, the spring-loaded button 39 is mounted through the fixed insert end 26 and into the insert sleeve 28. In order to separate the elongated hollow insert 25 from within the insert sleeve 28, the spring-loaded button 39 is operatively coupled to the first spring-loaded pin 33 and the second spring-loaded pin 36, wherein the spring-loaded button 39 is further pressed into the insert sleeve 28 in order to disengage the first spring-loaded pin 33 from the first pinhole 31 and in order to disengage the second spring-loaded pin 36 from the second pinhole 32.

Figure 6:
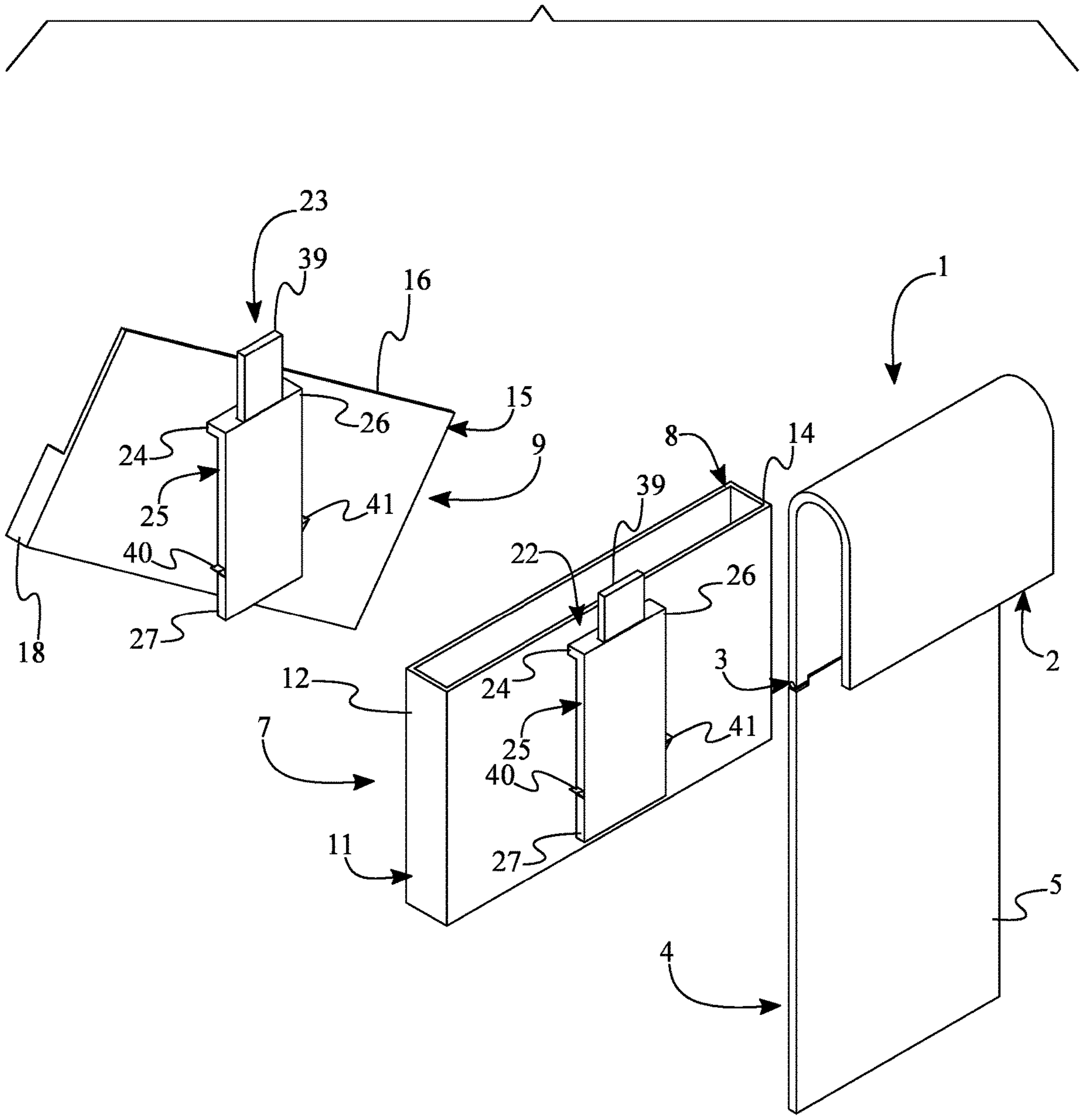
FIG. 6 is a rear exploded view of the third embodiment of the present invention.
Figure 7:
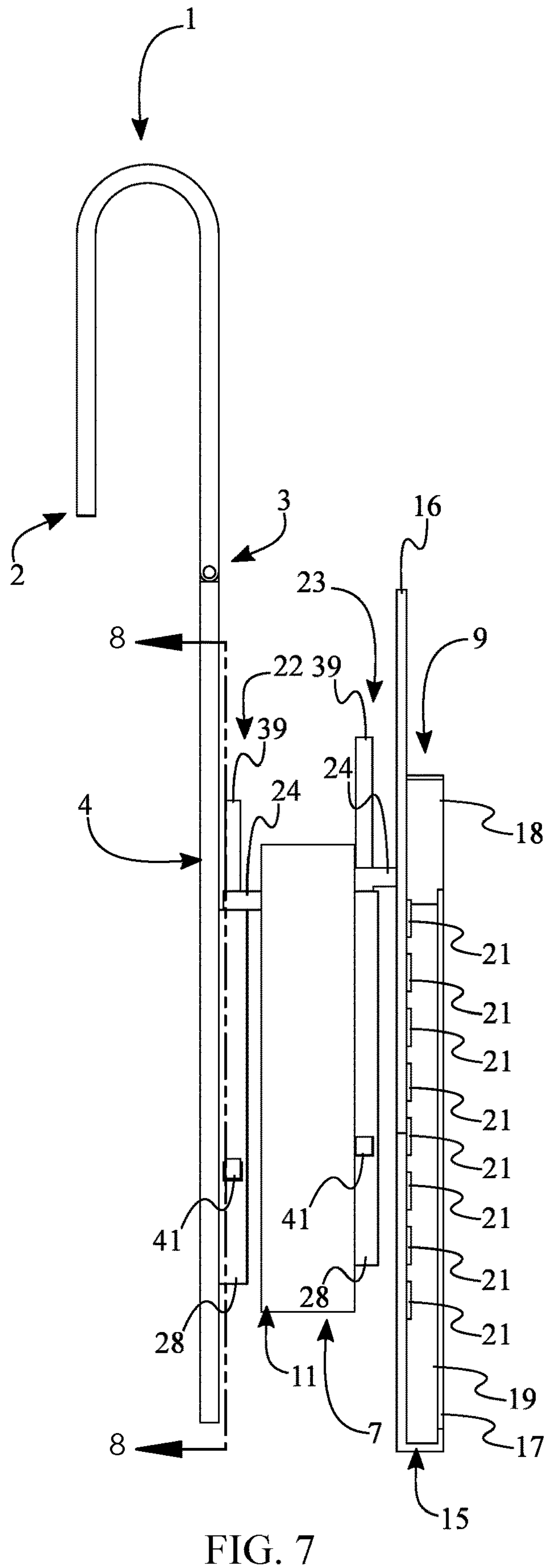
FIG. 7 is a side view of the third embodiment of the present invention.

Furthermore, the primary attachment mechanism 22 further comprises a first prong 40 and a second prong 41, seen in FIG. 6, FIG. 7, and FIG. 8. The first prong 40 and the second prong 41 latch with the insert sleeve 28 to further secure the first spring-loaded pin 33 and the second spring-loaded pin 36 through the insert sleeve 28. The first spring-loaded pin 33 comprises a first fixed end 34 and a first free end 35. Similarly, the second spring-loaded pin 36 comprises a second fixed end 37 and a second free end 38. The first fixed end 34 connects the first spring-loaded pin 33 within the elongated hollow insert 25, and the second fixed end 37 connects the second spring-loaded pin 36 within the elongated hollow insert 25. The first free end 35 and the second free end 38 serve as stoppers for the first spring-loaded pin 33 and the second spring-loaded pin 36, respectively, with the insert sleeve 28. In order for the elongated hollow insert 25 to be automatically connected with the insert sleeve 28 when positioned within the insert sleeve 28, the first fixed end 34 is hingedly connected with the second fixed end 37. A spring is preferably positioned adjacent with the first free end 35 and the second free end 38 to automatically push the first free end 35 and the second free end 38 into the first pinhole 31 and the second pinhole 32, respectively. More specifically, the first free end 35 is engaged through the first pinhole 31, and the second free end 38 is engaged through the second pinhole 32 to automatically connect the elongated hollow insert 25 with the insert sleeve 28. The connection is secure as the first prong 40 is fixed adjacent with the first free end 35, and the second prong 41 is fixed adjacent with the second free end 38. The first prong 40 and the second prong 41 latch with the insert sleeve 28 as the first prong 40 and the second prong 41 are oriented away from the free insert end 27.

A third embodiment of the present invention further comprises a secondary spackle-knife holder 9 and a secondary attachment mechanism 23, seen in FIG. 4, FIG. 5, FIG. 6, and FIG. 7. The secondary spackle-knife holder 9 serves as an additional housing for at least one spackle knife along with the primary spackle-knife holder 7. The secondary spackle-knife holder 9 allows a user to organize multiple spackle knives with the primary spackle-knife holder 7. The secondary attachment mechanism 23 connects the secondary spackle-knife holder 9 with the primary spackle-knife holder 7. Similar with the primary spackle-knife holder 7, the secondary spackle-knife holder 9 comprises a secondary knife-receiving feature 10. The secondary knife-receiving feature 10 readily receives and releases the at least one spackle knife within the secondary spackle-knife holder 9. In order for the third embodiment of the present invention to remain compact while attached with the clothing of a user, the secondary spackle-knife holder 9 is positioned adjacent to the primary spackle-knife holder 7. The secondary spackle-knife receiving feature is oriented towards the U-shaped hook 1, thereby orienting the at least one spackle knife away from the ground. If at any point the secondary spackle-knife holder 9 needs to be temporarily removed or interchanged, the secondary spackle-knife holder 9 is operatively mounted onto the primary spackle-knife holder 7 by the secondary attachment mechanism 23, wherein the secondary attachment mechanism 23 is used to attach the secondary spackle-knife holder 9 to the primary spackle-knife holder 7 and to detach the secondary spackle-knife holder 9 from the primary spackle-knife holder 7.

In the third embodiment of the present invention, the primary spackle-knife holder 7 preferably comprises a holding receptacle 11, and the secondary spackle-knife holder 9 further comprises a holding sheath 15, seen in FIG. 4, FIG. 5, FIG. 6, and FIG. 7. In this preferred embodiment the plurality of smaller spackle knives is positioned within the holding receptacle 11, and the larger spackle knife if positioned within the holding sheath 15. This arrangement allows the larger spackle knife to still be readily separated from the holding sheath 15 as seen in the second embodiment of the present invention.

In order to retain the larger spackle knife, the holding sheath 15 comprises a cover plate 16, a ledge 17, a tab 18, and a lip 19, seen in FIG. 4, FIG. 5, FIG. 6, and FIG. 7. The cover plate 16 traverses across the width of the blade portion of the larger spackle knife, preferably with a blade that is between 7 inches to 12 inches. The ledge 17 upholds the spackle knife. The tab 18 serves as a stopper for a side edge of the blade portion. And the lip 19 guards the sharp edge of the larger spackle knife and prevents the larger spackle knife from being accidently separated from the holding sheath 15. In order to uphold the larger spackle knife, the ledge 17 is peripherally positioned with the cover plate 16 and is being fixed across the cover plate 16. The user easily centers the blade portion with the cover plate 16 as the tab 18 is peripherally positioned with the ledge 17 and the cover plate 16, and the tab 18 is fixed adjacent with the ledge 17 and the cover plate 16. This arrangement reduces the chances of the larger spackle knife from being accidentally pushed from side to side. The sharp edge of the blade portion is shielded between the cover plate 16 and the lip 19 as the lip 19 is positioned adjacent with the ledge 17, opposite the cover plate 16, and is fixed along the ledge 17. The primary spackle-knife holder 7 nor the cover plate 16 inhibit the removal or positioning of the larger spackle knife with the holding sheath 15 as the secondary attachment mechanism 23 is mounted onto the cover plate 16, opposite the ledge 17. In order to further accommodate the position of the present invention along the waistline of the user, the cover plate 16 is oriented at an acute angle with the secondary attachment mechanism 23, thereby orienting the larger spackle knife towards the reach of the user. Furthermore, in order for the larger spackle knife to be readily detached from the holding sheath 15, the secondary knife-receiving feature 10 is an opening 20 of the holding sheath 15. The opening 20 of the holding sheath 15 is delineated by the cover plate 16, the tab 18, and the lip 19, thereby providing clear view of the larger spackle knife while attached with the holding sheath 15 while simultaneously safely retaining the larger spackle knife.

Figure 4:
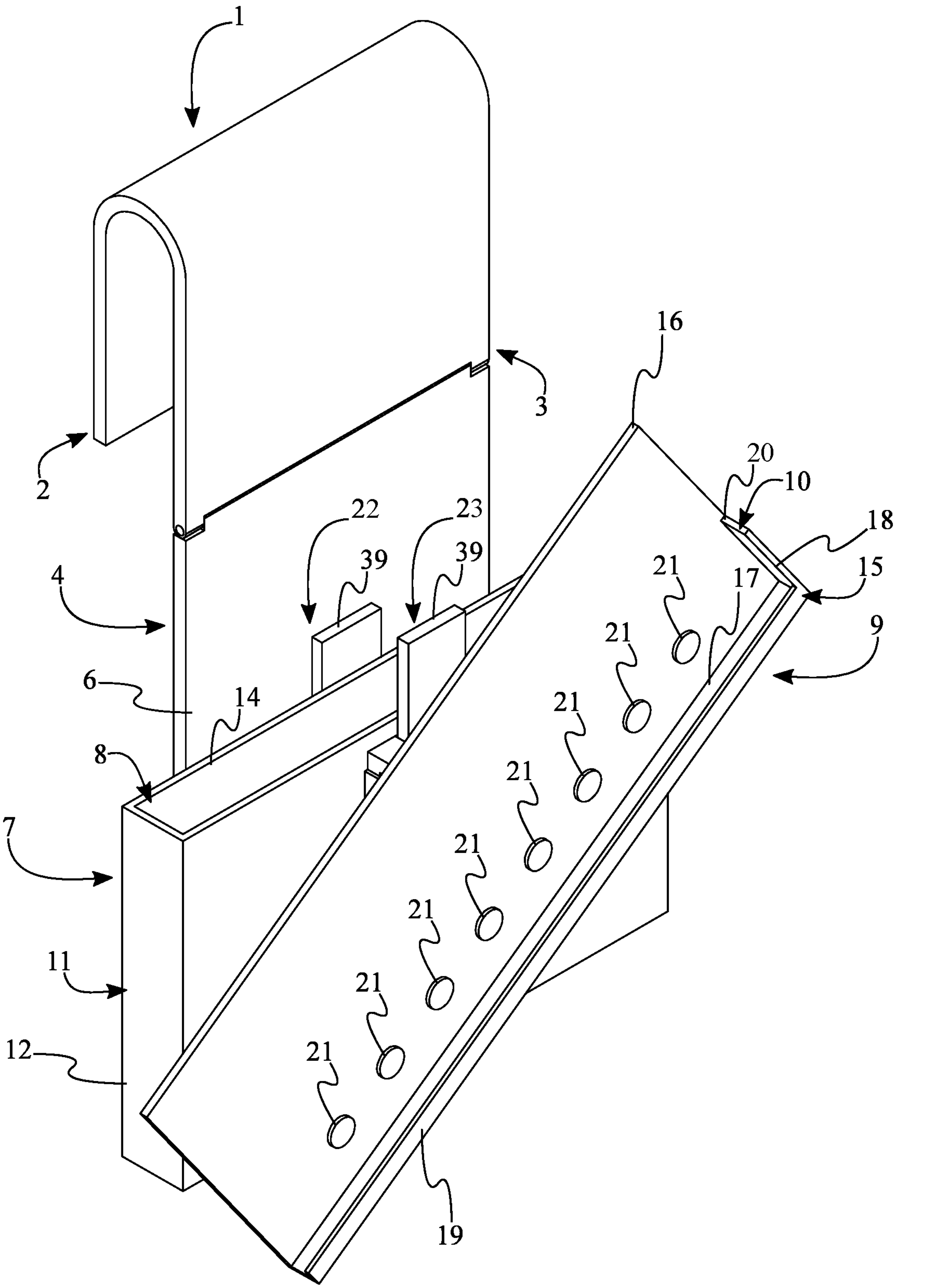
FIG. 4 is a perspective view of a third embodiment of the present invention.
Figure 5:
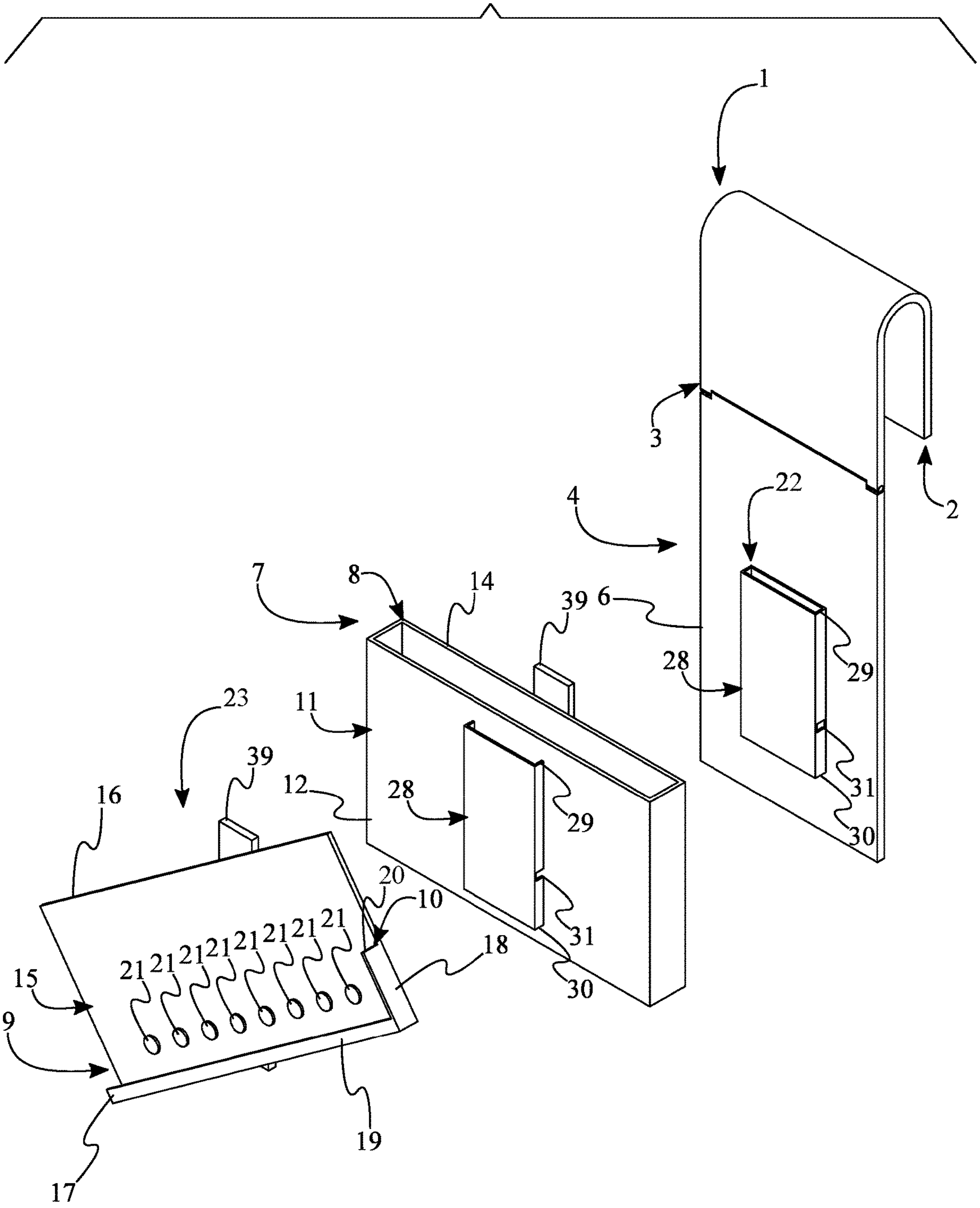
FIG. 5 is a front exploded view of the third embodiment of the present invention.

As the opening 20 of the holding sheath 15 extends across the blade portion of a larger spackle knife, in the third embodiment of the present invention as that in the second embodiment of the present invention, the holding sheath 15 preferably further comprises a plurality of magnets 21, seen in FIG. 4, FIG. 5, and FIG. 7. The plurality of magnets 21 securely connects the blade portion with the cover plate 16 until purposefully separated by the user. As the blade portion is positioned beside the cover plate 16, opposite the secondary attachment mechanism 23, the plurality of magnets 21 is positioned adjacent with the cover plate 16, opposite the secondary attachment mechanism 23 as well. This arrangement allows the plurality of magnets 21 to come in direct contact with the blade portion. In order for the blade portion to be readily removed from the holding sheath 15, but firmly attached while positioned within the sheath, the plurality of magnets 21 is positioned offset from the ledge 17 and is positioned along the ledge 17. The connection between the plurality of magnets 21 and the blade portion is secure as the plurality of magnets 21 is fixed across the cover plate 16.

Alternatively, the secondary spackle-knife holder 9 further comprises a holding receptacle 11, similar to that seen in FIG. 1. The third embodiment may then retain a first set of smaller spackle knives and a second set of larger spackle knives, wherein the first set of smaller spackle knives is housed within the primary spackle-knife holder 7, and the second set of larger spackle knives is housed within the second spackle-knife holder. In order to surround the blade portion of each of the plurality of smaller spackle knives, the holding receptacle 11 comprises a receptacle lateral wall 12 and a receptacle base wall 13. The receptacle lateral wall 12 surrounds the sides of the blade portion, and the receptacle base wall 13 upholds the plurality of smaller spackle knives, preferably with blades that are 6 inches and smaller. The blade portion is completely surrounded as the receptacle lateral wall 12 is positioned adjacent with the receptacle base wall 13 and is perimetrically fixed around the receptacle base wall 13. The holding receptacle 11 is readily attached and detached with the bracing plate 4 as the secondary attachment mechanism 23 is externally mounted onto the receptacle lateral wall 12. Furthermore, in order for the user to readily access the handles of the plurality of smaller spackle knives, the secondary knife-receiving feature 10 is an opening 14 of the holding receptacle 11. The opening 14 of the holding receptacle 11 is positioned opposite the receptacle base wall 13 about the holding receptacle 11, thereby effectively housing the plurality of smaller spackle knives throughout wear and use of the present invention.

Furthermore, the holding receptacle 11 of this third embodiment further comprises a handle-receiving groove 42, similar to that seen in FIG. 9. The handle-receiving groove 42 provides access for a handle of a large spackle knife within the holding receptacle 11. A width of the holding receptacle 11 is smaller than a width of the holding receptacle 11 of the embodiment that has been previously discussed. More specifically, the width of the holding receptacle 11 for the alternate third embodiment is preferably 0.125 inches. This alternate third embodiment safely houses and grips onto a large spackle knife as the handle of the large spackle is also positioned within the holding receptacle 11. In order for the handle to traverse into the holding receptacle 11, the handle-receiving groove 42 is integrated within the receptacle lateral wall 12 and is positioned offset from the receptacle base wall 13. Moreover, the handle-receiving groove 42 is positioned coincident to an opening 14 of the holding receptacle 11. This arrangement contours the receptacle lateral wall 12 around the structure of the large spackle knife. In order for the large knife to be easily removed from the holding receptacle 11 with the handle-receiving groove 42, the receptacle lateral wall 12 is oriented at an acute angle with the secondary attachment mechanism 23.

In order for the secondary spackle-knife holder 9 to be readily attached and detached with the primary spackle-knife holder 7, the secondary attachment mechanism 23 comprises an insert spacer 24, an elongated hollow insert 25, and an insert sleeve 28, seen in FIG. 5, FIG. 6, FIG. 7, and FIG. 8. The insert spacer 24 attaches the elongated hollow insert 25 with the secondary spackle-knife holder 9. The elongated hollow insert 25 latches into the insert sleeve 28, which is connected with the bracing plate 4. Moreover, the insert sleeve 28 readily receives the elongated hollow insert 25. The elongated hollow insert 25 comprises a fixed insert end 26 and a free insert end 27. The fixed insert end 26 is attached with the secondary spackle-knife holder 9, and the free insert end 27 engages with the insert sleeve 28. The insert sleeve 28 comprises an open sleeve end 29 and a closed sleeve end 30. The open sleeve end 29 readily receives the free insert end 27, and the closed sleeve end 30 stops the free insert end 27 from extending any further past the insert sleeve 28 and upholds the elongated hollow insert 25 with the bracing plate 4. As the secondary spackle-knife holder 9 is positioned adjacent with the primary spackle-knife holder 7, the insert sleeve 28 is connected onto the primary spackle-knife holder 7. In order to orient the elongated hollow insert 25, and consequently the secondary spackle-knife holder 9, away from the ground, the open sleeve end 29 is oriented towards the U-shaped hook 1. The elongated hollow insert 25 is positioned offset with the secondary spackle-knife holder 9 and insert sleeve 28 may be positioned around the elongated hollow insert 25 as the fixed insert end 26 is mounted onto the secondary spackle-knife holder 9 by the insert spacer 24. The free insert end 27 is oriented away from the secondary knife-receiving feature 10, thereby allowing the elongated hollow insert 25 to slip 19 into the insert sleeve 28 and keeping the secondary knife-receiving feature 10 oriented away from the ground. The secondary spackle-knife holder 9 connects with the bracing plate 4 as the elongated hollow insert 25 is positioned through the open sleeve end 29 and into the insert sleeve 28.

In order to release the connection between the elongated hollow insert 25 and the insert sleeve 28, the secondary attachment mechanism 23 further comprises a first spring-loaded pin 33, a second spring-loaded pin 36, and a spring-loaded button 39, seen in FIG. 8. Moreover, the insert sleeve 28 further comprises a first pinhole 31 and a second pinhole 32. The first spring-loaded pin 33 and the second spring-loaded pin 36 attaches the elongated hollow insert 25 within the insert sleeve 28 through the first pinhole 31 and the second pinhole 32, respectively. The spring-loaded button 39 releases the first spring-loaded pin 33 and the second spring-loaded pin 36 from within the first pinhole 31 and the second pinhole 32, respectively. The first pinhole 31 and the second pinhole 32 allow the first spring-loaded pin 33 and the second spring-loaded pin 36 to traverse through the insert sleeve 28 while preserving the structural integrity of the insert sleeve 28. Moreover, the first pinhole 31 and the second pinhole 32 allow the first spring-loaded pin 33 and the second spring-loaded pin 36 to extend through the insert sleeve 28 so that the secondary spackle-knife holder 9 is not simply separated from the bracing plate 4 by lifting the elongated hollow insert 25 out of the insert sleeve 28. The spring-loaded button 39 must be engaged in order to retract the first spring-loaded pin 33 and the second spring-loaded pin 36. Conversely, the secondary spackle-knife holder 9 is automatically attached with the bracing plate 4 once the first spring-loaded pin 33 and the second spring-loaded pin 36 extend into the first pinhole 31 and the second pinhole 32, respectively, due to a spring that simultaneously engages both the first spring-loaded pin 33 and the second spring-loaded pin 36. The spring-loaded button 39 preferably comprises a body portion and a couple of tabs. The body portion accessible by the user to push the spring-loaded button 39. The couple of tabs are internally positioned within the elongated hollow insert 25 and presses against the first spring-loaded pin 33 and the second spring-loaded pin 36 in order to retract the first spring-loaded pin 33 and the second spring-loaded pin 36. More specifically, as the spring-loaded button 39 retracts within the elongated hollow insert 25, the first spring-loaded pin 33 and the second spring-loaded pin 36 simultaneously retracts into the elongated hollow insert 25.

The overall configuration of the aforementioned components allows a user to easily attach and detach the elongated hollow insert 25 from within the insert sleeve 28. The first spring-loaded pin 33 and the second spring-loaded pin 36 remain protected within the elongated hollow insert 25 as the first spring-loaded pin 33 and the second spring-loaded pin 36 are laterally mounted within the elongated hollow insert 25, seen in FIG. 6, FIG. 7, and FIG. 8. Moreover, the first spring-loaded pin 33 and the second spring-loaded pin 36 are positioned opposite to each other about the elongated hollow insert 25. Likewise, the first pinhole 31 and the second pinhole 32 are laterally positioned opposite to each other about the insert sleeve 28, so that the first pinhole 31 and the second pinhole 32 readily receive the first spring-loaded pin 33 and the second spring-loaded pin 36, respectively. The elongated hollow insert 25 is secured within the insert sleeve 28 as the first spring-loaded pin 33 is engaged into the first pinhole 31, and the second spring-loaded pin 36 is engaged into the second pinhole 32. This arrangement effectively secures the secondary spackle-knife holder 9 with the bracing plate 4. In order for the spring-loaded button 39 to engage the first spring-loaded pin 33 and the second spring-loaded pin 36, as well as remain readily accessible by the user, the spring-loaded button 39 is mounted through the fixed insert end 26 and into the insert sleeve 28. In order to separate the elongated hollow insert 25 from within the insert sleeve 28, the spring-loaded button 39 is operatively coupled to the first spring-loaded pin 33 and the second spring-loaded pin 36, wherein the spring-loaded button 39 is further pressed into the insert sleeve 28 in order to disengage the first spring-loaded pin 33 from the first pinhole 31 and in order to disengage the second spring-loaded pin 36 from the second pinhole 32.

Furthermore, the secondary attachment mechanism 23 further comprises a first prong 40 and a second prong 41, also seen in FIG. 6, FIG. 7, and FIG. 8. The first prong 40 and the second prong 41 latches with the insert sleeve 28 to further secure the first spring-loaded pin 33 and the second spring-loaded pin 36 through the insert sleeve 28. The first spring-loaded pin 33 comprises a first fixed end 34 and a first free end 35. Similarly, the second spring-loaded pin 36 comprises a second fixed end 37 and a second free end 38. The first fixed end 34 connects the first spring-loaded pin 33 within the elongated hollow insert 25, and the second fixed end 37 connects the second spring-loaded pin 36 within the elongated hollow insert 25. The first free end 35 and the second free end 38 serve as stoppers for the first spring-loaded pin 33 and the second spring-loaded pin 36, respectively, with the insert sleeve 28. In order for the elongated hollow insert 25 to be automatically connected with the insert sleeve 28 when positioned within the insert sleeve 28, the first fixed end 34 is hingedly connected with the second fixed end 37. A spring is preferably positioned adjacent with the first free end 35 and the second free end 38 to automatically push the first free end 35 and the second free end 38 into the first pinhole 31 and the second pinhole 32, respectively. More specifically, the first free end 35 is engaged through the first pinhole 31, and the second free end 38 is engaged through the second pinhole 32 to automatically connect the elongated hollow insert 25 with the insert sleeve 28. The connection is secure as the first prong 40 is fixed adjacent with the first free end 35, and the second prong 41 is fixed adjacent with the second free end 38. The first prong 40 and the second prong 41 latch with the insert sleeve 28 as the first prong 40 and the second prong 41 are oriented away from the free insert end 27.

Although the invention has been explained in relation to its preferred embodiment, it is to be understood that many other possible modifications and variations can be made without departing from the spirit and scope of the invention as hereinafter claimed.

What is claimed is:

1. A modular spackle knife caddy comprising:
a U-shaped hook;
a bracing plate;
a primary spackle-knife holder;
a primary attachment mechanism;
the U-shaped hook comprising a free hook end and a fixed hook end;
the bracing plate comprising a proximal plate face and a distal plate face;
the primary spackle-knife holder comprising a primary knife-receiving feature;
the primary attachment mechanism comprising an insert spacer, an elongated hollow insert, and an insert sleeve;
the elongated hollow insert comprising a fixed insert end and a free insert end;
the insert sleeve comprising an open sleeve end and a closed sleeve end;
the fixed hook end being peripherally positioned with the bracing plate;
the fixed hook end being hingedly connected with the bracing plate;
the free hook end being oriented away from the distal plate face;
the free hook end being positioned offset from the proximal plate face;
the primary knife-receiving feature being oriented towards the U-shaped hook;
the primary spackle-knife holder being operatively mounted onto the distal plate face by the primary attachment mechanism, wherein the primary attachment mechanism is used to attach the primary spackle-knife holder to the distal plate face and to detach the primary spackle-knife holder from the distal plate face;
the insert sleeve being connected onto the distal plate face;
the open sleeve end being oriented towards the U-shaped hook;
the fixed insert end being mounted onto the primary spackle-knife holder by the insert spacer;
the free insert end being oriented away from the primary knife-receiving feature; and,
the elongated hollow insert being positioned through the open sleeve end and into the insert sleeve.

2. The modular spackle knife caddy as claimed in claim 1 comprising:
the primary spackle-knife holder further comprising a holding receptacle;
the holding receptacle comprising a receptacle lateral wall and a receptacle base wall;
the receptacle lateral wall being positioned adjacent with the receptacle base wall;
the receptacle lateral wall being perimetrically fixed around the receptacle base wall; and,
the primary attachment mechanism being externally mounted onto the receptacle lateral wall.

3. The modular spackle knife caddy as claimed in claim 2 comprising:
the primary knife-receiving feature being an opening of the holding receptacle; and,
the opening of the holding receptacle being positioned opposite the receptacle base wall about the holding receptacle.

4. The modular spackle knife caddy as claimed in claim 2 comprising:
the holding receptacle further comprising a handle-receiving groove;
the handle-receiving groove being integrated within the receptacle lateral wall;
the handle-receiving groove being positioned offset from the receptacle base wall;
the handle-receiving groove being positioned coincident to an opening of the holding receptacle; and
the receptacle lateral wall being oriented at an acute angle with the primary attachment mechanism.

5. The modular spackle knife caddy as claimed in claim 1 comprising:
the primary spackle-knife holder further comprising a holding sheath;
the holding sheath comprising a cover plate, a ledge, a tab, and a lip;
the ledge being peripherally positioned with the cover plate;
the ledge being fixed across the cover plate;
the tab being peripherally positioned with the ledge and the cover plate;
the tab being fixed adjacent with the ledge and the cover plate;
the lip being positioned adjacent with the ledge, opposite the cover plate;
the lip being fixed along the ledge;
the primary attachment mechanism being mounted onto the cover plate, opposite the ledge; and,
the cover plate being oriented at an acute angle with the primary attachment mechanism.

6. The modular spackle knife caddy as claimed in claim 5 comprising:
the primary knife-receiving feature being an opening of the holding sheath; and,
the opening of the holding sheath being delineated by the cover plate, the tab, and the lip.

7. The modular spackle knife caddy as claimed in claim 5 comprising:
the holding sheath further comprising a plurality of magnets;
the plurality of magnets being positioned adjacent with the cover plate, opposite the primary attachment mechanism;
the plurality of magnets being positioned offset from the ledge;
the plurality of magnets being positioned along the ledge; and,
the plurality of magnets being fixed across the cover plate.

8. The modular spackle knife caddy as claimed in claim 1 comprising:

the primary attachment mechanism further comprising a first spring-loaded pin, a second spring-loaded pin, and a spring-loaded button;

the insert sleeve further comprising a first pinhole and a second pinhole;

the first spring-loaded pin and the second spring-loaded pin being laterally mounted out of the elongated hollow insert;

the first spring-loaded pin and the second spring-loaded pin being positioned opposite to each other about the elongated hollow insert;

the first pinhole and the second pinhole being laterally positioned opposite to each other about the insert sleeve;

the first spring-loaded pin being engaged into the first pinhole;

the second spring-loaded pin being engaged into the second pinhole;

the spring-loaded button being mounted through the fixed insert end and into the insert sleeve; and, the spring-loaded button being operatively coupled to the first spring-loaded pin and the second spring-loaded pin, wherein the spring-loaded button is further pressed into the insert sleeve in order to disengage the first spring-loaded pin from the first pinhole and in order to disengage the second spring-loaded pin from the second pinhole.

9. The modular spackle knife caddy as claimed in claim 1 comprising:

the primary attachment mechanism further comprising a first prong and a second prong;

the first spring-loaded pin comprising a first fixed end and a first free end;

the second spring-loaded pin comprising a second fixed end and a second free end;

the first fixed end being hingedly connected with the second fixed end;

the first free end being engaged through the first pinhole;

the second free end being engaged through the second pinhole;

the first prong being fixed adjacent with the first free end;

the second prong being fixed adjacent with the second free end; and, the first prong and the second prong being oriented away from the free insert end.

10. The modular spackle knife caddy as claimed in claim 1 comprising:

a secondary spackle-knife holder;

a secondary attachment mechanism;

the secondary spackle-knife holder comprising a secondary knife-receiving feature;

the secondary spackle-knife holder being positioned adjacent to the primary spackle-knife holder;

the secondary knife-receiving feature being oriented towards the U-shaped hook; and, the secondary spackle-knife holder being operatively mounted onto the primary spackle-knife holder by the secondary attachment mechanism, wherein the secondary attachment mechanism is used to attach the secondary spackle-knife holder to the primary spackle-knife holder and to detach the secondary spackle-knife holder from the primary spackle-knife holder.

11. The modular spackle knife caddy as claimed in claim 10 comprising:

the secondary spackle-knife holder further comprising a holding sheath;

the holding sheath comprising a cover plate, a ledge, a tab, and a lip;

the ledge being peripherally positioned with the cover plate;

the ledge being fixed across the cover plate;

the tab being peripherally positioned with the ledge and the cover plate;

the tab being fixed adjacent with the ledge and the cover plate;

the lip being positioned adjacent with the ledge, opposite the cover plate;

the lip being fixed along the ledge;

the secondary attachment mechanism being mounted onto the cover plate, opposite the ledge; and, the cover plate being oriented at an acute angle with the secondary attachment mechanism.

12. The modular spackle knife caddy as claimed in claim 11 comprising:

the secondary knife-receiving feature being an opening of the holding sheath; and, the opening of the holding sheath being delineated by the cover plate, the tab, and the lip.

13. The modular spackle knife caddy as claimed in claim 11 comprising:

the holding sheath further comprising a plurality of magnets;

the plurality of magnets being positioned adjacent with the cover plate, opposite the secondary attachment mechanism;

the plurality of magnets being positioned offset from the ledge;

the plurality of magnets being positioned along the ledge; and, the plurality of magnets being fixed across the cover plate.

14. The modular spackle knife caddy as claimed in claim 10 comprising:

the secondary spackle-knife holder further comprising a holding receptacle;

the holding receptacle comprising a receptacle lateral wall and a receptacle base wall;

the receptacle lateral wall being positioned adjacent with the receptacle base wall;

the receptacle lateral wall being perimetrically fixed around the receptacle base wall; and, the secondary attachment mechanism being externally mounted onto the receptacle lateral wall.

15. The modular spackle knife caddy as claimed in claim 14 comprising:

the secondary knife-receiving feature being an opening of the holding receptacle; and, the opening of the holding receptacle being positioned opposite the receptacle base wall about the holding receptacle.

16. The modular spackle knife caddy as claimed in claim 14 comprising:

the holding receptacle further comprising a handle-receiving groove;

the handle-receiving groove being integrated within the receptacle lateral wall;

the handle-receiving groove being positioned offset from the receptacle base wall; and, the handle-receiving groove being positioned coincident to an opening of the holding receptacle; and the receptacle lateral wall being oriented at an acute angle with the secondary attachment mechanism.

17. The modular spackle knife caddy as claimed in claim 10 comprising:
- the secondary attachment mechanism comprising an insert spacer, an elongated hollow insert, and an insert sleeve;
- the elongated hollow insert comprising a fixed insert end and a free insert end;
- the insert sleeve comprising an open sleeve end and a closed sleeve end;
- the insert sleeve being connected onto the primary spackle-knife holder;
- the open sleeve end being oriented towards the U-shaped hook;
- the fixed insert end being mounted onto the secondary spackle-knife holder by the insert spacer;
- the free insert end being oriented away from the secondary knife-receiving feature; and,
- the elongated hollow insert being positioned through the open sleeve end and into the insert sleeve.

18. The modular spackle knife caddy as claimed in claim 17 comprising:
- the secondary attachment mechanism further comprising a first spring-loaded pin, a second spring-loaded pin, and a spring-loaded button;
- the insert sleeve further comprising a first pinhole and a second pinhole;
- the first spring-loaded pin and the second spring-loaded pin being laterally mounted out of the elongated hollow insert;
- the first spring-loaded pin and the second spring-loaded pin being positioned opposite to each other about the elongated hollow insert;
- the first pinhole and the second pinhole being laterally positioned opposite to each other about the insert sleeve;
- the first spring-loaded pin being engaged into the first pinhole;
- the second spring-loaded pin being engaged into the second pinhole;
- the spring-loaded button being mounted through the fixed insert end and into the insert sleeve; and,
- the spring-loaded button being operatively coupled to the first spring-loaded pin and the second spring-loaded pin, wherein the spring-loaded button is further pressed into the insert sleeve in order to disengage the first spring-loaded pin from the first pinhole and in order to disengage the second spring-loaded pin from the second pinhole.

19. The modular spackle knife caddy as claimed in claim 17 comprising:
- the secondary attachment mechanism further comprising a first prong and a second prong;
- the first spring-loaded pin comprising a first fixed end and a first free end;
- the second spring-loaded pin comprising a second fixed end and a second free end;
- the first fixed end being hingedly connected with the second fixed end;
- the first free end being engaged through the first pinhole;
- the second free end being engaged through the second pinhole;
- the first prong being fixed adjacent with the first free end;
- the second prong being fixed adjacent with the second free end; and,
- the first prong and the second prong being oriented away from the free insert end.

* * * * *